June 5, 1951

K. EMDE ET AL 2,555,478

RECORD CHANGING MEANS

Filed Jan. 4, 1946

5 Sheets-Sheet 1

RALPH A. MULLANEY
KURT EMDE
INVENTORS

BY David McDavis
Frank L. Mauritz

THEIR ATTORNEYS

RALPH A. MULLANEY
KURT EMDE
INVENTORS.
BY David M. Davis
Frank L. Mauritz
THEIR ATTORNEYS

RECORD CHANGING MEANS

Filed Jan. 4, 1946

RALPH A. MULLANEY
KURT EMDE
INVENTORS
BY David M. Davis
Frank L. Mauritz
THEIR ATTORNEYS RALPH A. MULLANEY
KURT EMDE
INVENTORS.
BY [signatures]
THEIR ATTORNEYS

RECORD CHANGING MEANS

Filed Jan. 4, 1946 5 Sheets-Sheet 5

RALPH A. MULLANEY
KURT EMDE
INVENTORS
BY
THEIR ATTORNEYS

Patented June 5, 1951

2,555,478

UNITED STATES PATENT OFFICE 2,555,478

RECORD CHANGING MEANS

Kurt Emde, Itasca, and Ralph A. Mullaney, Elmwood Park, Ill., assignors to Zenith Radio Corporation, a corporation of Illinois Application January 4, 1946, Serial No. 639,067

6 Claims. (Cl. 274—10)

This invention relates to automatic phonographs and more particularly relates to an improved automatic record changer for phonographs.

It is desirable that record changing mechanisms be foolproof in operation, simple, economical to build and positive in operation to minimize record breakage.

Record changers with the conventional record supporting and separating knives must be manufactured with their dimensions maintained accurately, thus necessitating high manufacturing costs and complexity, otherwise there is a considerable amount of record breakage. For these reasons, it is desirable to provide record changers in which the stack of records is supported on a spindle having an offset shoulder from which the bottommost one only is fed to the record turntable by providing mechanism for moving such bottommost record off the offset shoulder and allowing it to drop and be guided by the centering portion of the spindle, while the other records are maintained in supported position ready for sequential feeding to the turntable.

In such record changers it is desirable to play either a plurality of 10-inch or 12-inch records or 10-inch and 12-inch records intermixed, and for that purpose it is desirable to provide a mechanism which causes the tone arm to be positioned automatically for playing either a 10-inch record or a 12-inch record without the necessity of manual adjustment of the apparatus.

It is therefore an object of the present invention to provide an improved record changer that is simple in operation, economical to build, foolproof in operation, and which functions with a minimum amount of record breakage.

A further object of the present invention is to provide an improved mechanism allowing automatic operation of the record changer to play a series of intermixed 10-inch and 12-inch records.

Still a further object of the present invention is to provide a record changer of a type wherein the bottommost one of a series of records is supported at its center on an offset portion of the centering pin and a peripheral portion of such record is supported on a shelf structure which cooperates with an improved record displacing member to displace from the shelf in order an intermixed series of 10-inch and 12-inch records.

Yet a further object of the present invention is to provide an improved tone arm adjusting mechanism useful in record changers not only of the type utilizing an offset shoulder on the centering spindle for supporting records but also in other types.

Another object of the present invention is to provide an improved simple, compact, inexpensive mechanism operable upon the completion of the playing of a record for setting into motion mechanism utilizing a slanting centering spindle with an offset shoulder, such improved mechanism being characterized by a novel arrangement of parts for displacing individually from such slanting spindle in order a series of intermixed records of different diameters.

Another object of the present invention is to provide an improved slanting spindle structure having an offset shoulder.

Another object of the present invention is to provide a novel spring biased structure for maintaining a series of records on a spindle of the offset shoulder type ready for feeding to the turntable of record playing machines.

Still another object of the present invention is to provide a novel supporting spindle structure which has relatively movable parts thereof to allow easy removal of "played" records from the turntable.

Yet another object of the present invention is to provide a novel record discriminator structure for adjusting the initial starting position of a tone arm on the starting groove of either a 10-inch or a 12-inch record as the case may be.

Yet a further object of the present invention is to provide a novel electrically operated arrangement for effecting control operations of a record changer during the record changing cycle.

Still a further object of the present invention is to provide a record changer of the offset spindle type having a novel reject mechanism which may be operated by moving an element normally operative to feed records to the turntable.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings, in which:

Figure 1:
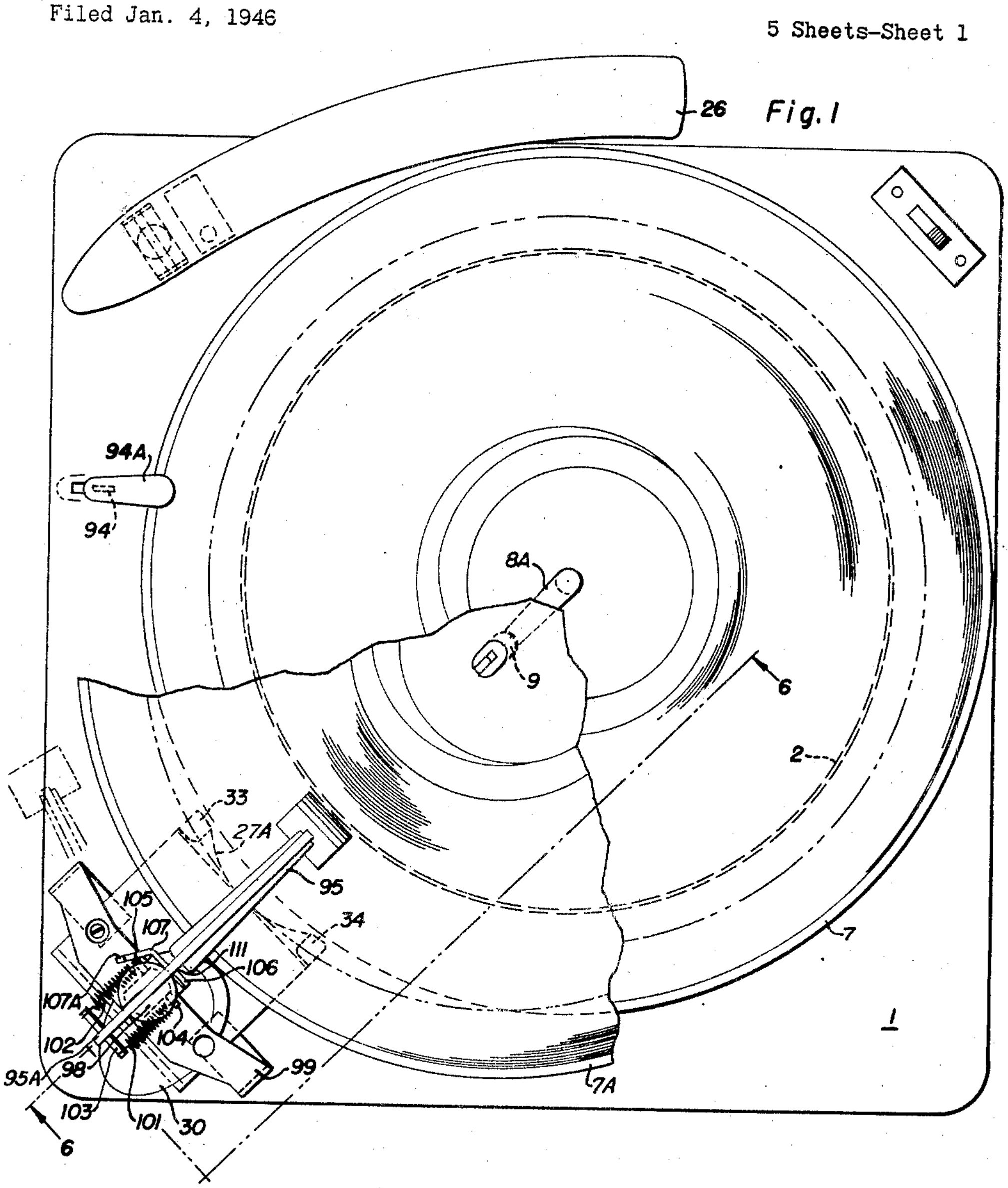
Figure 1 is a plan view of an improved record changer incorporating the present invention, in which the tone arm is shown at the end of its outward swing and just before the start of playing of a 12-inch record.
Figures 2, 7, 8, 9:
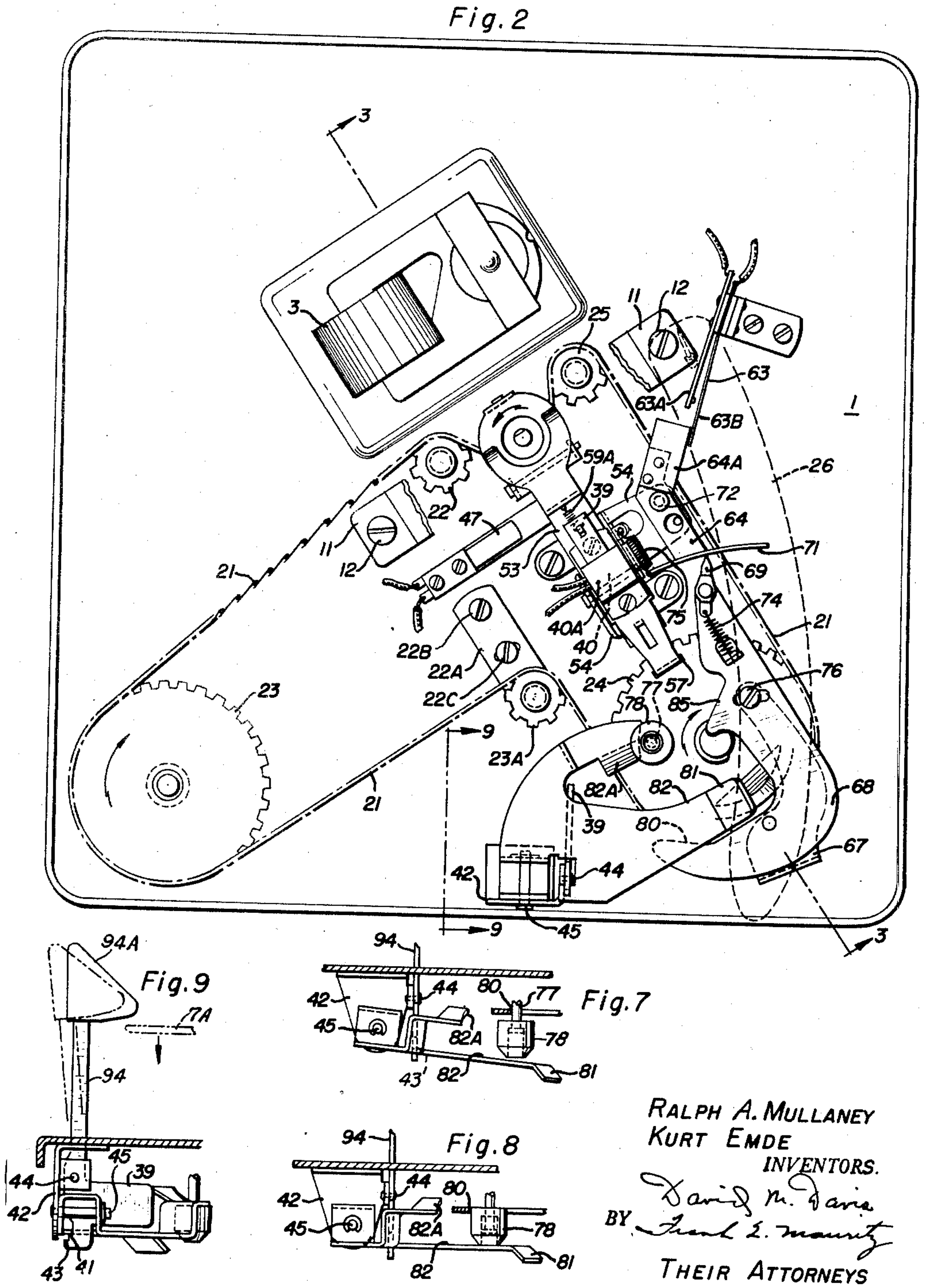
Figure 2 is a view in elevation of the bottom of the record changer shown in Figure 1, but with the parts shown in their relative positions at one position during the record playing interval.
Figures 3, 4, 5, 15:
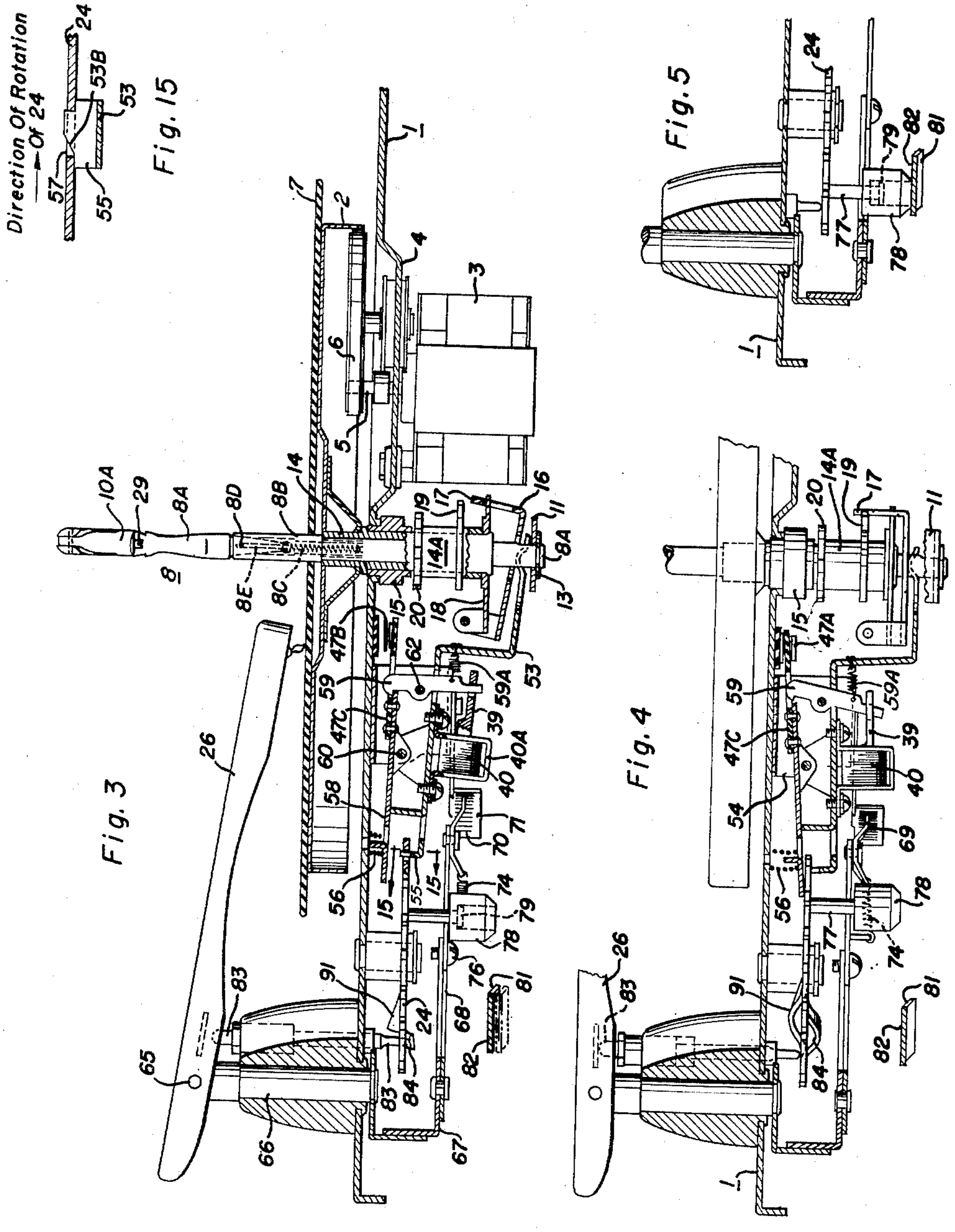
Figure 3 is a sectional view taken substantially on the line 3—3 of Figure 2, but with the parts shown therein in their relative positions during the record playing interval.
Figures 4 and 5 show parts of the apparatus shown in Figure 3 but in different operating positions, Figures 4 and 5 showing the parts in different positions in the record changing cycle wherein the tone arm will be positioned for a 10-inch record.

Figures 7 and 8 are sectional views of a portion of the apparatus shown in Figure 4 and show parts of the tone arm adjusting mechanism shown in Figures 1 and 3 in different operating positions when the tone arm is being adjusted for 12-inch records;

Figure 9 shows the discriminator element after it has been engaged by a falling record for adjusting the initial position of the tone arm for playing a 12-inch record.

Figure 10:
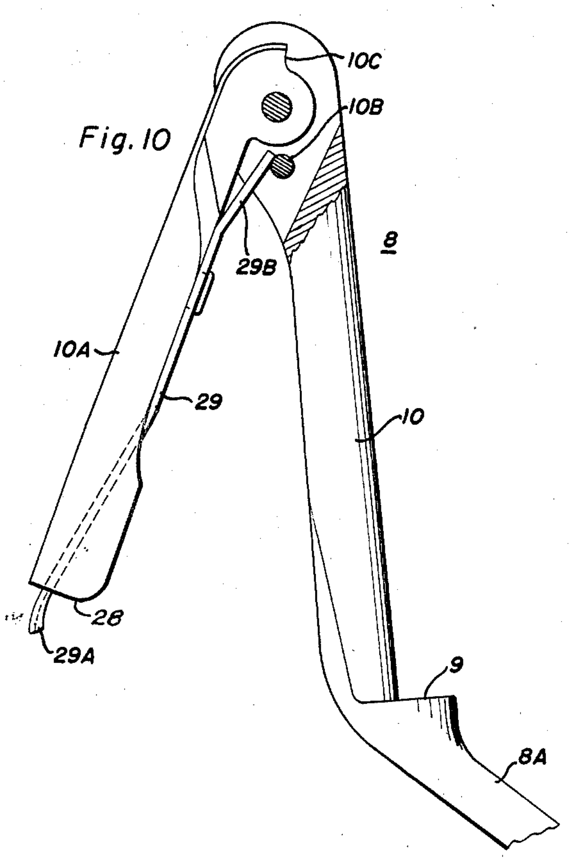
Figure 11:
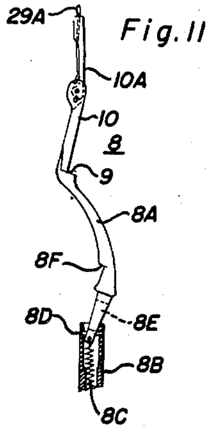

Figures 10 and 11 show details of the record spindle of the record changer of Figures 1–9, inclusive.

Figure 12:
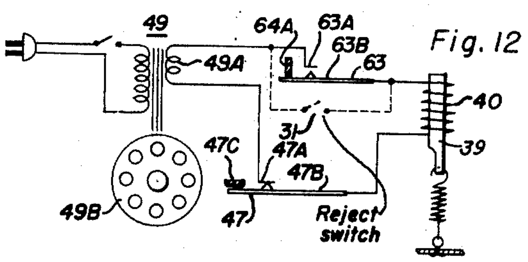

Figure 12 shows an electrical-mechanical arrangement for effecting certain control operations in the machine of Figures 1–11.

Figures 13, 14:
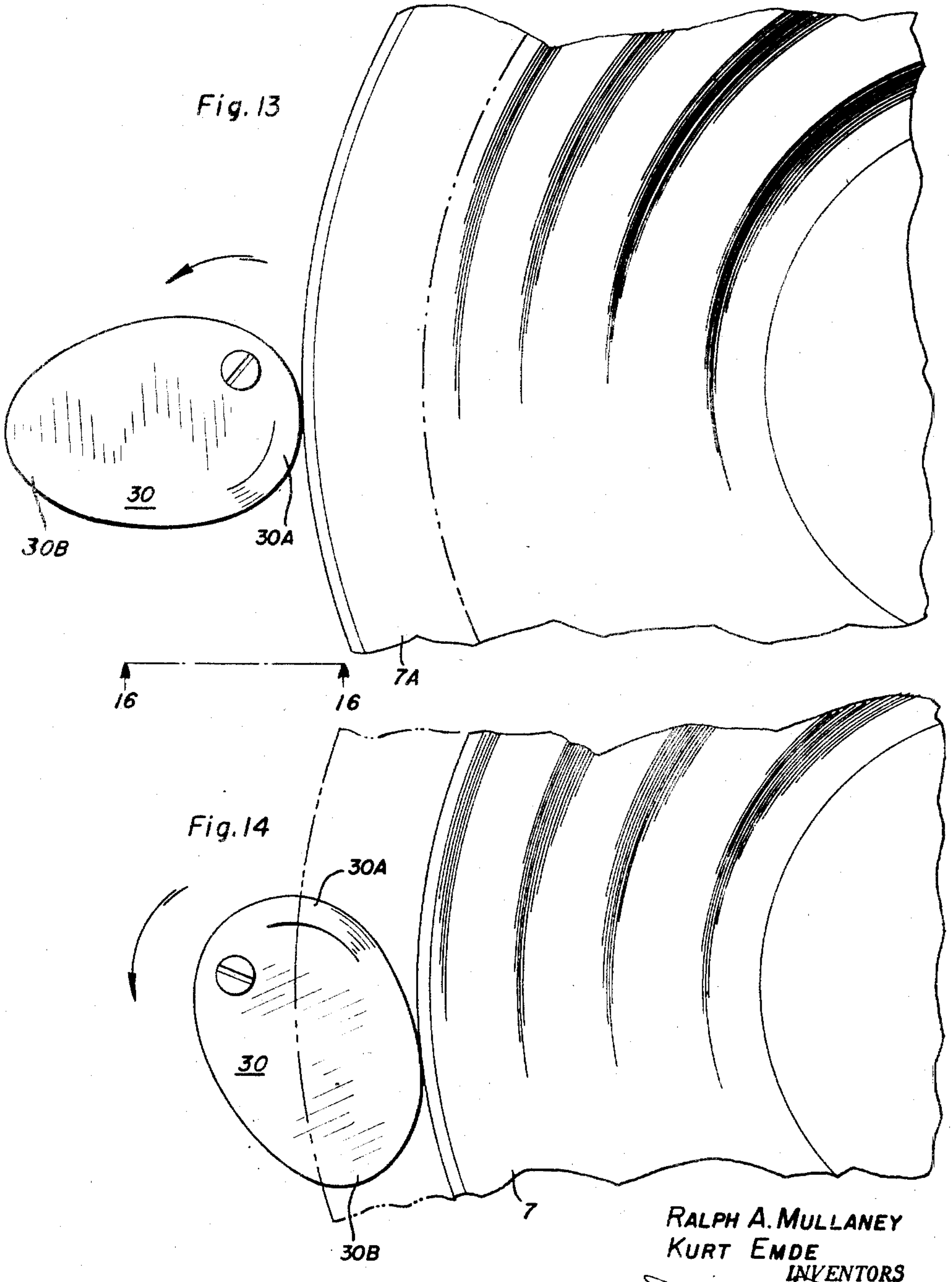
Figure 16:
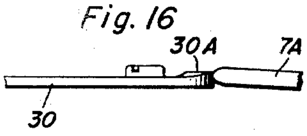

Figures 13 and 14 show portions of the record changing mechanism in different operating positions, Figure 15 is a sectional view of a portion of the apparatus shown in Figure 3, and Figure 16 is an elevational view taken on the line 16—16 of Figure 13.

In accordance with the present invention, there is provided in an automatic record changer including a rotatable turntable and a motor, the combination of a mechanism adapted |to be driven by the motor for successively transferring successive ones of a plurality of intermixed records of different diameter into playing position on the turntable during successive record changing cycles, and means actuated by movements of the mechanism for establishing a driving connection between the motor and the mechanism thereby to initiate one of the record changing cycles.

*Turntable and record changing mechanism drive*

Referring now more particularly to Figures 1, 2 and 3 of the drawings, there is shown a base plate 1 upon which the record changer mechanism is mounted. For playing records there is provided a turntable 2 driven by a motor 3 mounted on a mounting plate 4 integrally formed with base plate 1. Between the motor shaft 5 and the rim of the turntable 2 there is provided a friction wheel 6 rotatably mounted on the mounting plate 4, rotary motion of the motor being transferred to the turntable through the friction wheel 6.

For centering record 7 on the turntable there is provided a slanting arcuate shaped obliquely extending or curved spindle 8 having an offset shoulder 9 adapted to provide support near the center of the bottommost record threaded on the offset portion 10 of the spindle 8.

The stationary spindle 8 extends downwardly through the relatively movable turntable and has its bottommost end held by bracket 11 fastened on base plate 1 by means of, for example, screws 12, the end of spindle 8 being flattened and snugly received in noncircular opening in bracket 11. A washer 13, removable and of resilient nature, disposed on a point on spindle 8 of reduced diameter and between the end of spindle 8 and bracket 11, locks spindle 8 against upward movement. The intermediate portion of the spindle 8 serves as a bearing member for the inner portion of sleeve 14. The outer portion of the sleeve 14 is journaled for rotation within a second sleeve 15 fixed on base plate 1 by, for example, welding, shrink fit, etc.

It is clear from the construction thus far described that the spindle 8 may be removed by removing the resilient washer 13 and moving the spindle 8 upwardly if need be to remove the spindle 8.

The turntable 2 is preferably permanently mounted on the sleeve 15 without end play by providing in conventional manner permanent or movable shoulders on the turntable sleeve 14 where it enters the larger inner diameter opening of sleeve 15.

It is also clear that the turntable 2 is mounted for rotation about an axis passing through the axis of the lower portion of centering pin 8, the turntable 2 being driven by motor 3 through friction wheel 6. Normally, during the record playing cycle, the turntable sleeve 14 rotates independently of outer sleeve 14A rotatably mounted thereon, but during the record changing cycles these two sleeves 14 and 14A are rotated simultaneously through a clutch having the general reference numeral 16. Suffice it to say for the present that clutch 16 is actuated by tone arm responsive means described later, and that the clutch itself comprises finger 17 pivotally mounted on an extension 18 of turntable sleeve 14, the end of finger 17 being movable upwardly in Figure 3 to engage extension 19 on sleeve 14A to rotate sleeve 14A and the integrally formed sprocket wheel 20 arranged to transmit motion to an endless sprocket chain 21 which in turn passes over an idler wheel 22, sprocket wheel 23, adjustable sprocket wheel 23A, sprocket wheel 24, idler wheel 25, back to sprocket wheel 20 to impart motion to the components of the record changing mechanism. The idler 23A is adjustably mounted for rotatable movement on mounting plate 22A which is adjustably held on base plate 1 by means of holding screws 22B, 22C.

Sprocket wheel 23 serves to impart motion to the record feeding mechanism described later, while sprocket wheel 24 is modified not only to move the tone arm 26 properly during the record changing cycle but also to cause suitable operation of tripping mechanism described later to cause movement of finger or lever 17 of clutch 16 to its driving position and cause feeding of records from a record supporting structure described now.

*Record supporting and feeding structure*

The record changer described may in its preferred form feed a series of 10-inch records or a series of 12-inch records or feed 10-inch and 12-inch records intermixedly. Certain mechanism shown and described herein causes certain parts of the record changing mechanism to be actuated by a falling record, regardless of how it is initially supported by, for example, knives or other transfer mechanism and it is apparent that such mechanisms may be employed in record changers of the knife type.

Figure 6:
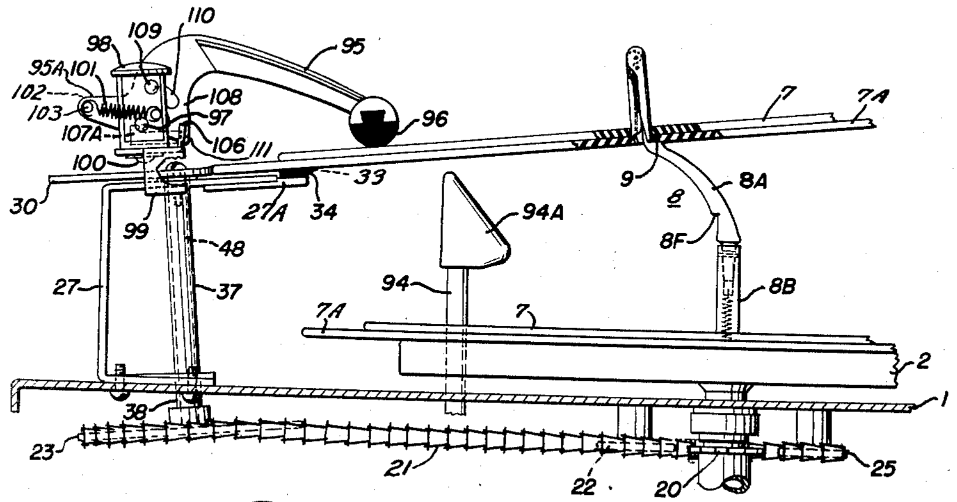
Figure 6 is a sectional view taken substantially on line 6—6 of Figure 1, wherein a 12-inch record is held in position on the adjustable shelf 27.

Referring to Figures 1 and 6, the record changer preferably includes the slanted curved centering spindle 8 having an offset shoulder 9 with an upper surface elevated a small distance above the upper surface of shelf 27 so that as shown in Figure 6 a record is supported at an angle of approximately five and one-half degrees, such surface of shoulder 9 being displaced from the terminating surface 28 of portion 10A (see Figure 10) by a distance slightly greater than the thickness of a 12-inch record. A spring 29 having a point intermediate its ends fastened within a recess in the hinged member 10A has one of its free ends 29A extending immediately above the upper surface of shoulder 9 and presses the bottommost record supported on shoulder 9 to the left in Figure 6 against the offset portion 10 to insure the dropping of one record at a time when the pusher plate 30 is oscillated by means described later, the other free end 29B of the spring 29 being placed in tension by engagement with the pin 10B shown in Figure 10.

It is noted in Figure 6 that the supporting spindle has an offset shoulder 9 and a stationary downwardly extending portion 8B joined together by the slanted spindle portion 8A which serves to space the shoulder 9 in a horizontal direction away from the prolongation of the axis of such downwardly extending portion 8B a distance greater than the difference in radius of the two different diameter records shown supported on the spindle.

The pusher plate 30 has a thickness slightly less than the thickness of a 10-inch record, and suffice it to say for the present that it is moved in a direction substantially parallel to its plane during the record changing cycle to engage the bottommost record in a stack of records so as to move it against the biasing action of spring 29 beyond the edge of shelf 27 and shoulder 9, from where the record 7 falls by gravity down the centering spindle 8.

The record supporting shelf 27 as shown comprises a U-shaped member having one of its legs fastened to the base plate so as to use the upper surface of the other leg as a supporting surface for the edges of supported records. The shelf 27 thus formed has a plate 27A fastened thereon to carry a pair of elevated resilient pads 33, 34 upon which the outer portion of a 10-inch or 12-inch record as the case may be is adapted to rest. Thus, in Figures 1 and 6 an outer portion of a 12-inch record 7A is shown supported on resilient pads 33, 34 while the center portion thereof is supported on offset shoulder 9.

Spacer sleeve 37 for spacing the legs of the U-shaped shelf 27 has a driving shaft 48 passing therethrough. The shaft 48 is journaled in opposite legs of the U-shaped shelf structure 27 and has fixedly mounted on one end thereof the pusher plate 30 and on the other end thereof the driving sprocket wheel 23. A second spacer sleeve 38 is disposed between sprocket wheel 23 and the base leg of shelf structure 27.

Sprocket wheel 23 driven by sprocket chain 21 only during the record changing cycle is arranged to make only one revolution per record changing cycle, during which the pusher plate 30 makes one complete revolution in the direction of its plane to push a record off the shelf 27 upon which the bottommost record of a stack normally rests.

It is thus clear that when sprocket wheel 23 makes a complete revolution a rotational movement is imparted to pusher plate 30 to such an extent that either a 10-inch record or a 12-inch record is shoved off the shelf member, it being remembered that a record changing cycle is effected when the clutch 16 is actuated.

*Clutch actuating mechanism*

In order to actuate clutch 16 or, in particular, in order to bring the clutch lever 17 into engagement with the extension 19 against the gravity forces acting on finger or clutch lever 17 to initiate a record changing cycle, there is provided lever 53 which is pivotally supported intermediate its ends by a supporting bracket 54 mounted on the bottom of base plate 1 as shown in Figures 2, 3 and 4. For arresting the motion of the record changing mechanism not only at the end of a record changing cycle but also during the record playing cycle, the lever 53 is provided with an extension 55 which is adapted to come into engagement when the pressure of the coil spring 56 is removed, with an opening 57 in the sprocket cam wheel 24, which opening is of elongated rectangular shape with its short side extending radially on the sprocket cam wheel 24 as shown in Figure 2. When the coil compression spring 56 is allowed to exert its force on lever 53, its right end is moved upwardly to engage clutch lever 17 to in turn cause engagement between clutch lever 17 and extension 19 to initiate a record changing cycle. During the record playing cycle, spring 56 is prevented from exerting its force against actuating lever 53 due to the fact that an intermediate force transmitting element, the pivoted lever 58, is prevented from moving since, as shown in Figure 3, it is held in latched position during the record playing cycle by means of pivoted latch member 59.

As seen most clearly in Figure 3, coil spring 56 does not rest on the actuating lever 53 directly, but the force from such spring is transferred initially through the lever 58 pivoted at point 60 intermediate its ends on bracket 54 which in turn is mounted on base plate 1. The left end of lever 58 in Figure 3 serves as a link to connect spring 56 to actuating lever 58 while the position of the right end of lever 58 may be controlled by the latch member 59 pivoted on pin 62 having one of its ends fixed in bracket 54.

Latch member 59 may have its lower end controlled in position by either (1) manual movement of pusher plate 30 as described later in connection with the reject mechanism or (2) solenoid means engaged by a part of the tone arm tripping mechanism (described under the next heading), the function performed by these two means being to transmit clockwise movement (Figure 3) to latching member 59 to free pivoted lever 58 so that it may transmit to actuating lever 53 the force developed in compression spring 56 to, in turn, cause counterclockwise movement of actuating lever 53 and engagement of clutch members 17 and 19 to initiate a record changing cycle.

*Tripping mechanism actuated by tone arm*

For actuating the clutch 16 at the end of each record playing cycle and thereby to initiate a record changing cycle, the tone arm 26 is pivotally hinged at point 65 to a rotatably mounted shaft 66, to the other end of which a suitable extension 67 is fixedly attached to hold an adjustable plate 68, which in turn supports tripping pawl 69, the plate 68 having suitable cam surfaces arranged to be engaged by means (described later) for properly positioning the tone arm at the starting point of either a 10-inch or a 12-inch record, as the case may be. The tripping pawl 69 and cooperating ratchet portion 70, comprising a series of saw-toothed embossments or indentations on the curved portion 71 of tripping arm 64 which is pivoted at point 72 on the mounting bracket 54, cooperate upon reverse movement (clockwise in Figure 2) of the tone arm, for example, in the oscillatory tripping groove of a record to pivot tripping arm 64 in a counterclockwise direction (Figure 2) to move latching member 59 by the solenoid means described presently to its unlatched position to initiate a record changing cycle. During the record playing cycle the pawl 69, normally spring biased by tension spring 74 to extend in a radial direction about the axis of shaft 66, moves slowly over the ratchet surface portion 70 without pivoting the integrally formed switch actuating arm 64 from its normal position wherein it is biased by tension spring 75 to its furthest clockwise position (Figure 2) to normally maintain the switch 63 in open circuit condition, but when the tone arm is given a reverse motion such reverse motion is imparted to the pawl 69 and causes positive engagement with the ratchet portion 70 and consequent counterclockwise movement of switch actuating arm 64 to a position where switch 63 is allowed to close to initiate a record changing cycle as described previously. The switch 63 itself comprises a stationary contact member 63A and a cooperating contact member 63B of spring material biased to normally engage contact 63A. During the record playing cycle switch 63 is maintained open by insulating member 64A which is mounted on arm 64 and biased by spring 75, the spring 75 being stronger than the spring action inherent in spring contact member 63B.

*Automatic setting of tone arm at beginning of playing either 10-inch or 12-inch records*

The main elements for automatically setting the tone arm to its proper position for starting the playing of 10- or 12-inch records, as the case may be, are: The cam plate 68 initially fastened in adjusted position by means of set screw 76, pin member 77 having slidably mounted thereon cylindrically shaped slug member 78 of predetermined dimensions which normally rests, due to gravity forces acting thereon, against the enlarged head 79 from where it may be displaced upward under certain conditions during the record changing cycle when and as the sprocket wheel 24 carrying pin member 77 at its upper end is rotated by the sprocket chain 21. It is noted that the wall thickness of the hollow wall cylindrical member 78 corresponds to the difference in radius of a 10-inch and a 12-inch record to effect the proper adjustment. For the present, suffice it to say that when the tone arm is placed in proper starting position for playing 12-inch records, pin member 77 engages the cam edge 80 of cam plate 68 as shown in Figure 7, and that when the tone arm is placed in proper starting position for playing 10-inch records the slug member 78 moved upward by the cam surface 81 on slug elevating cam member 82 engages the cam edge 80 as shown in Figure 8 to move the tone arm to its starting position, the cam member 82 being allowed to move by gravity from its normal supported position wherein 10-inch records are played (Figure 8) to its other position shown in Figure 7 by movement of discriminator element 94 caused only by engagement therewith of a falling 12-inch record 7A as shown in Figure 9. Certain aspects of the tone arm positioning system just described are disclosed and claimed in the copending application of Kurt Emde, Serial Number 616,842, filed September 17, 1945 which is assigned to the same assignee as this application.

The cam member 82 is pivotally mounted on pin 45 which passes through enlarged holes in opposite legs of a U-shaped extension of cam plate 82 and has its (pin 45) opposite ends fixed in at least one of a pair of downwardly extending ears of a bracket 42 mounted on base plate 1. The pivot point of cam member 82 is so chosen with respect to its center of gravity that the cam member 82 itself tends to rotate clockwise in Figures 7 and 8 but such clockwise movement is limited by one of a pair of stepped stops 41 and 43 integrally formed on the lower end of discriminator lever 94 which is pivoted at a point intermediate its ends on a pin 44 which is fastened on an ear of bracket 42. The discriminator lever 94 has integrally formed thereon a weighted portion 39 to cause the center of gravity of the discriminator lever 94 to be such that it tends to rotate clockwise in Figure 9 to normally press one of the two stepped stops 41 or 43 as the case may be into engagement with an extension on cam member 82 to limit its movement and to maintain it in proper position for automatic adjustment of the tone arm. Suffice it to say for the present that the cam member 82 rests on stop 41 exclusively when a stack of only 10-inch records are played but when 12-inch records are transferred to the turntable such 12-inch records engage the discriminator head 94A to move the lever 94 and allow cam member 82 to fall by gravity on lower stop 43 from where the cam member 82 is returned to upper stop 41 during the latter part of the record changing cycle due to the engagement of the upper surface of slug member 78 with a second cam surfaced extension 82A on cam member 82.

Referring to Figure 2, during the record changing cycle the sprocket wheel 24 is rotated in the direction of the arrow, the tone arm is lifted by tone arm pusher rod 83 (shown more clearly in Figures 3 and 4) which during the record playing cycle is held by gravity forces acting thereon in the recessed cam portion 84 of sprocket wheel 24 but which during the record changing cycle rides on the upper surface of sprocket wheel 24 to hold the tone arm in nonoperating position, the pin member 77 initially engages the cam edge 85 of cam plate 68 to move the tone arm outwardly from the center of the turntable and later engages the cam edge 80 of plate 68 provided the machine is adjusted to play 12-inch records, and then rotates further out of engagement with the plate 68 after the tone arm is allowed to drop on the 12-inch record by tone arm pusher rod 83 entering the cam recess 84 in the sprocket wheel 24.

When the machine plays only 10-inch records, during the record changing cycle as described above, the sprocket wheel 24 is rotated in the direction of the arrow, the tone arm is lifted by the tone arm pusher rod 83, pin member 77 engages the cam edge 85 of cam plate 68 to move the tone arm outwardly from the center of the turntable to allow another 10-inch record to fall by gravity thereupon, the slug member 78 normally resting in its downward position on enlarged pin head 79 rides on cam surface 81 of the slug positioning cam 82 up to the upper surface thereof where the slug member 78 is in a position to contact the cam edge 80 of cam plate 68 to properly position the tone arm above the starting groove of a 10-inch record, and upon further rotation of the single revolution sprocket wheel 24, at the end of its cycle, the slug 78 falls by gravity to its most downward position from which it either may again be raised to contact cam edge 80 when another 10-inch record is changed, or in which it may remain out of engagement with cam edge 80 when a 12-inch record is changed. That is, when a 10-inch record is changed slug member 78 contacts edge 80 to properly position the tone arm at the starting groove of a 10-inch record while, when a 12-inch record is changed, pin member 77 contacts edge 80 to properly position the tone arm at the starting groove of a 12-inch record, the slug member 78 either being moved to operative position when 10-inch records are played or allowed to remain in its "inoperative" position when 12-inch records are played.

It is noted that the slug positioning cam 82 has two positions corresponding to the operative and "inoperative" positions of the slug member 78, and that the cam 82 is allowed to move from its normal position wherein 10-inch records are played to a record position wherein 12-inch records may properly be played upon engagement of a falling 12-inch record with the discriminator head 94A.

*Electrical trip mechanism*

The record changing mechanism is set into operation by moving the latch member 59 as described previously. The latch member 59 as shown in Figure 3 is mechanically coupled to a movable magnetic armature 39 magnetically associated with a solenoid 40 which is held in place by a frame member 40A which in turn is fixedly mounted on the pivoted lever 53. A spring 59A coupled between one end of latch member 59 and lever 53 biases the catch 59 about its pivot 62 in a direction counterclockwise as represented in Figs. 3 and 4. Energization of solenoid 40 results in movement of armature 39 to the left in Figure 3 and movement of latch 59 to effect a record changing cycle. The solenoid is energized through a series circuit including switch 63 (described previously) which is normally open during the record playing cycle but which is closed at least for a moment when the tone arm is given a reverse movement as for example when the phonograph stylus moves in the oscillatory groove of a phonograph record as described previously.

Low voltage energy for energizing solenoid 40 may be obtained, as shown and claimed in the copending application of Gilbert E. Gustafson, Serial Number 638,950, now abandoned, filed on the same date as the present application, by transformer action from a portion of the phonograph motor 3 itself. That is, as shown in Figure 12, the solenoid 40 is serially connected with switch 63, switch 47 (described later) and the secondary winding 49A of a step down transformer 49, the primary winding of which may comprise the conventional high voltage field winding of the turntable motor 3 whose armature is represented by the numeral 49B. Switch 47 comprising contacts 47A and 47B as shown in Figure 3 is normally closed during the record playing cycle, contact 47A being stationary and contact 47B being disposed in the path of movement of insulating member 47C on pivoted lever 58 so that when the pivoted lever 58 is no longer held in latched position by latch 59 the switch 47 is held in open position as shown in Figure 4 to insure complete deenergization of solenoid 40 whereby solenoid armature 39 under the action of spring 59A may assume its normal position shown in Figure 3.

*Automatic operation for 10-inch records*

When the tone arm is given a rearward movement, for example, by the phonograph needle traveling in the eccentric end groove of a record, the tripping pawl 69 engages the ratchet portion 70 to cause energization of solenoid 40 through switch 63 and movement of the pivoted latch member 59 to unlatched position, thus allowing compression spring 56 to exert its full force on clutch actuating lever 53 to move clutch members 17 and 19 into engagement to open switch 47 and to cause extension 55 of the clutch actuating lever to be withdrawn from its locking position in sprocket wheel opening 57, whereupon a driving connection is made between the motor 3 and the sprocket chain 21 which is effective to drive the sprocket wheels 23 and 24 one revolution per record changing cycle, after which the clutch members 17 and 18 are automatically disengaged. One revolution of sprocket wheel 23 causes oscillation of the pusher plate 30 and a record to be dropped from the offset shoulder 9 upon the turntable. Simultaneously, one revolution of sprocket wheel 24 causes pusher rod 83 to move upwardly out of the sprocket wheel recessed cam portion 84 to lift the tone arm, the pin 77 is rotated whereupon slug member 78 loosely carried thereon moves upwardly thereon when it engages the cam surface 81 of the slug positioning cam 82 which is adjustably positioned on the upper stop 41 of discriminator lever 94 within an arc of movement of the slug member 78 to cause contact between the slug member 78 and cam edge 80 when and as the pusher rod 83 reenters the sprocket recessed cam portion 84, whereupon the tone arm is correctly positioned on a phonograph record at the start of the playing groove. During the remaining portion of the revolution of sprocket wheel 24, the slug member 78 becomes disengaged from the cam edge 80 and the slug positioning cam 82, after which the slug member falls by gravity to its normal position. Also, during one revolution of sprocket wheel 24, a raised cam portion 91 on sprocket wheel 24 abuts against the left end (Figure 3) of pivoted lever 58 to move it upwardly against compression spring 56, whereupon the latch member 59 biased by spring 59A maintains spring 56 in compressed condition after cam 91 moves out of engagement with pivoted lever 58 and switch 63 is maintained positively open and switch 47 is reclosed, in which case the clutch actuating lever extension 55 enters the cam wheel opening 57 after further rotation of the sprocket wheel 24, and the clutch actuating lever 53 is allowed to fall by gravity, whereupon clutch members 17 and 19 become disengaged, resulting in a positive locking of the record changing mechanism after one revolution of the sprocket wheels 23 and 24. The clutch 16 may then, after a record playing cycle, be engaged again as explained previously.

*Automatic operation for 12-inch records*

The operation for 12-inch records is the same as described above in connection with "Automatic Operation for 10-inch Records" but the slug member 78 (Figure 7) does not engage the cam 82, in which case the pin member 77 directly contacts the cam edge 80. This is brought about due to the fact that a 12-inch record moves the discriminator lever 94 to a position wherein cam member 82 drops onto the lower stop 43 wherein cam member 82, but for extension 82A, is positioned out of the path of movement of slug member 78. At the end of the record changing cycle the upper surface of slug member 78 engages cam surface 82A to move the cam member 82 upwardly to a position where it is latched by upper stop 41 from where it again may be lowered in case another 12-inch record is transferred to the turntable.

*Reject mechanism*

A feature of the present invention is that in a record changer of the type disclosed having a spindle with an offset shoulder, a reject operation may be effected by manual rotation of the pusher plate 30 in the direction which it normally moves during the record changing cycle. In such case when the pusher plate 30 is rotated, sprocket 23 of course is rotated to drive chain 21 and sprocket wheel 24 in the direction of the arrow in Figure 15. Such rotation of sprocket wheel 24 causes the left end of arm 53 in Figure 3 to be cammed downwardly and the right end of arm 53 to be moved upwardly to actuate clutch 16 and thus initiate a record changing cycle. In order that the pusher plate 30 may be moved easily by hand the extension 55 of arm 53 extending into the sprocket wheel opening 57 has a cammed leading edge 53B of relatively small slope.

It is noted that when a reject operation is thus effected by manual movement of pusher plate 30 the latch member 59 is not moved from its latched position.

In the modified arrangement shown in Figure 12 a normally open reject switch 31 may be provided. Switch 31 has its opposite terminals connected to opposite terminals of normally open switch 63. It is clear that closure of switch 31 will result in completion of the circuit to solenoid 40 and result in the initiation of a reject operation or initiation of a record changing cycle.

Referring to Figures 10 and 11 it is seen that the slanted spindle 8 comprises portions 10 and 10A above the record supporting shoulder 9; and, below the record supporting shoulder 9 there is the "goosenecked" or slanted portion 8A which is seated in the bottom portion 8B and normally held therein by a tension spring 8C extending into the hollow portion 8B and having one of its ends attached to movable portion 8A and its other end anchored in portion 8B. In order to prevent over stressing of spring 8C, a pin 8D fastened in the walls of portion 8B cooperates in a slotted cone shaped portion 8E of portion 8A and the looped end of spring 8C to prevent complete removal of portion 8A from portion 8B.

The articulated nature of spindle 8 allows easy removal of "played" records from the record turntable even though the spindle is of the so called slanted or "gooseneck" type.

In this respect, the notched portion 8F of portion 8A is of importance. Notched portion 8F is engaged by the inner walls defining the center hole of a record when such record is moved in the general upward direction from the turntable in which case the portion 8A is moved upwardly to its maximum vertical position shown in Figure 11, the spring 8C is stressed and the cone shaped nature of portion 8E allows an effective straightening of the slanted spindle to allow easy removal of records. After the record to be removed slides over the notched portion 8F it engages the lower end of spring 29 fastened to portion 10A and causes upward pivoted movement of portion 10A to a position substantially as shown in Figure 11.

It is noted that pin 10B not only provides a means for tensioning spring 29 when records are stacked on shoulder 9 for "playing," but also provides a stop which cooperates with shoulder 10C on portion 10A to limit movement thereof to a position indicated in Figure 11.

A feature of the particular spindle construction allows an operator with but a little experience to easily remove records from the turntable automatically with but a single upward movement of such records.

Another feature of the present invention resides in the novel arrangement for maintaining stacked records in suitable position on the shelf pads 33, 34 for displacement therefrom by the pusher plate 30. For this purpose, a spring biased arm 95 having a rubber record engaging surface 96 is pivotally mounted by means of pin 97 having its opposite ends fixedly mounted in opposite walls of a U-shaped guide bearing member 98 which in turn is pivotally mounted at the lower end thereof on stationary frame member 99 by utilizing the bottom surface of member 98 as a bearing surface and by passing a screw or rivet 100 having an enlarged head upwardly through an opening in frame member 99 into a suitable holding recess in member 98. The stationary frame member 99 comprises a rectangular strip to provide an opening through which pusher plate 30 may revolve and is fastened by means of screws or the like to the bottom surface of the upper U-shaped portion of record supporting shelf 27.

The free end of arm 95 is biased downwardly in all positions thereof by a pair of tension springs 101, 102 each of which have one end thereof looped over a common pin 103 stationarily mounted in a rearwardly extending extension 95A of arm 95 and the other ends of springs 101, 102 looped respectively over different pins 104, 105 stationarily mounted in oppositely disposed portions of U-shaped member 99.

The stationary frame member 99 has extending upwardly therefrom a pair of separated stop members 106, 107 which form an elongated slot 111 (Figures 1 and 6) in which a guide extension 108 is confined when arm 95 is positioned to bear on a record. After all of the records initially stacked on offset shoulder 9 are dropped therefrom onto the turntable, rivet 109 held in opposite walls of bearing member 98 and passing through an arcuate slot 110 in arm 95 limits downward movement of arm 95 by cooperation with the wall defining slot 110. In similar fashion rivet 109 engages the wall defining slot 110 to limit upward manual movement of arm 95 against the action of tension springs 101, 102.

In order to move arm 95 out of the path of movement of records which are to be removed either from offset shoulder 9 or from the turntable the arm 95 is pivoted upwardly and then rotated counterclockwise (Figure 1) to a position indicated by dotted lines wherein the elevated projection 107A of member 107 limits further rotational movement of arm 95. In order to return the arm 95 from its retracted position shown in dotted lines in Figure 1 to its normal record engaging positions shown in full lines, it is necessary only to rotate arm 95 clockwise in Figure 1 to a point where arm extension 108 engages the stop member 106, whereupon the tension exerted by springs 101, 102 automatically cause the arm extension 108 to enter its normal position in the slot 111.

An important feature of the present invention resides in the arrangement described wherein 10-inch and 12-inch records may be "played" intermixedly. For this purpose, the spindle 8 is "goosenecked" as described and the records are normally supported above the turntable at an angle of approximately five to six degrees and preferably five and one-half degrees with respect to the horizontal. A tilting of the stacked records upwardly from the supporting shelf is desirable because, inter alia, the uppermost edge of a stack of records is then practically at the same vertical height as the highest point on the arm 95 with a result that the composite record changer with stacked records are of minimum height in order that the composite record changer may be placed in a relatively small space within, for example, a radio cabinet to form a part of a radio-phonograph combination.

Another feature of the present invention resides in the novel construction and mounting of pusher plate 30. It is noted, as perhaps best seen in Figures 13 and 14 that the pusher plate 30 is substantially eggshaped in outline and that it is mounted for rotation about a point near the "butt" end of the eggshaped form at a point removed off each one of the pairs of axes defining the geometrical center of gravity. Referring to Figure 16, it is noted also that the "butt" end of the eggshaped pusher plate 30 has a raised portion 30A for contact with a 12-inch record only. The thickness of the "point" end 30B of the eggshaped cam 30 is approximately sixty-thousandths of an inch to allow it to push off a 10-inch record. The highest point on the raised portion 30A is approximately ninety-thousandths of an inch and is purposely made of greater height since the edge of a 12-inch record must travel a further distance off the supporting shelf than does a 10-inch record and in such further distance the edge of the 12-inch record is elevated due to the fact that the 12-inch record must slide down the "goosenecked" portion 8A while simultaneously traveling on the pads 33, 34 on the supporting shelf. In order to further facilitate the removal of both 10-inch and 12-inch records from the supporting shelf it is noted that the upper surface of supporting pads 33, 34 are elevated a slight distance above the plane of the bottom surface of pusher plate 30.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In a record changer mechanism, a rotatable turntable, a stationary spindle extending upwardly from the center of rotation of said turntable at an inclination to the vertical and having an offset shoulder portion for supporting a stack of intermixed records of different diameters at the center thereof, a record supporting shelf for supporting the outer edge of a supported record at a point lower than the vertical position of said offset shoulder, a record changer mechanism including a single revolution shaft, and a rotatable member coupled to said shaft for engaging and displacing a record laterally to cause it to be disengaged from supported position on said offset shoulder, said rotatable record engaging member comprising an oval shaped plate rotated about a point offset from each of the two axes defining its geometrical center of gravity.

2. The invention defined in the preceding claim characterized in that the oval shaped record engaging member comprises a plate having a raised portion on the periphery thereof for engagement only with a record of larger diameter.

3. In an automatic phonograph, a shaft rotatable during the record playing cycle of a phonograph record, record changing mechanism actuated during a record changing cycle, a clutch operable to connect said rotatable shaft to said record changing mechanism, and means automatically operable to actuate said clutch upon the completion of a record playing cycle, said means comprising a pivoted clutch actuating arm, a member movable during the record changing cycle, said member having a recessed portion to receive an extension of said pivoted arm to lock said record changing mechanism during the record playing cycle and carrying a cam, a latching member, a second pivoted arm engaged by said latching member and said clutch actuating arm, a spring arranged to transmit force to said clutch actuating arm through said second pivoted arm, when said second pivoted arm is not held in latched position by said latching member, said latching member when maintaining said second pivoted arm in latched position rendering ineffective any action of said spring on said clutch actuating arm, means actuated upon the completion of a playing cycle to unlatch said second pivoted arm to actuate said clutch and initiate a record changing cycle, said last mentioned means comprising a solenoid and associated armature mounted on said pivoted clutch actuating arm and operable upon energization to move said latching member to its unlatched position, said second pivoted arm being moved by said cam carried by said movable member to cause relatching of said second pivoted arm near the completion of a record changing cycle whereby said clutch actuating arm may return to its locking position in said recessed portion in the absence of a biasing action thereon from said spring.

4. In a tripping and recocking mechanism for automatic record changers in which the record changing mechanism is selectively connected to a continuously rotatable shaft by a clutch, a first pivoted clutch actuating arm, a spring, means interposed between said spring and clutch actuating arm to transmit the force of said spring to said clutch actuating arm to operate said clutch, latching means to maintain said last mentioned means in a position wherein substantially no force from said spring is transmitted to said clutch actuating arm, solenoid means mounted on said pivoted clutch actuating arm to actuate said latching means, a member movable with said record changing mechanism normally holding said clutch actuating member in clutch operating position during the record changing cycle, and means on said member for moving said first mentioned means at the end of a record changing cycle to a position wherein said first mentioned means may be relatched by said latching means.

5. In a record changer, a stationary spindle having upper and lower portions joined by a neck portion, said neck portion having a shoulder formed at the upper end thereof positioned to engage and support the lowest record in the stack of records of mixed diameter through the center hole of which said upper spindle portion extends, a fixed shelf constructed to engage the lower surface of an edge of the lowest record in the stack, a record changing mechanism including a single revolution shaft, and a rotatable plate coupled to said shaft and rotatable through 360° therewith for engaging and displacing the lowest record in the stack to move such record laterally off of said shoulder, said rotatable plate having on the periphery thereof a raised portion for engagement only with records of larger diameter, the distance between the lower end of said upper spindle portion and said shelf being less than the radius of the smallest diameter record in the stack and the distance between a part of said fixed spindle below said shoulder being spaced from said shelf a distance greater than the radius of the largest diameter record in the stack.

6. In a record changer, a stationary spindle having upper and lower portions joined by a neck portion, said upper spindle portion having a shoulder formed at the lower end thereof positioned to engage and support the lowest record in a stack of records of mixed diameters through the center holes of which said upper spindle portion extends, a fixed shelf constructed to engage the lower surface of an edge of the lowest record in the stack, a record changing mechanism including an oval shaped plate mounted to rotate about a point which is offset from each of the two axes defining its geometrical center of gravity and to engage and displace the lowest record in the stack laterally off of said shoulder, the distance between the lower end of said upper spindle portion and said shelf being less than the radius of the smallest diameter record in the stack and a part of said neck spindle below said shoulder being spaced from said shelf a distance greater than the radius of the largest diameter record in the stack.

KURT EMDE.
RALPH A. MULLANEY.

REFERENCES CITED

The following references are of record in the file of this patent:

UNITED STATES PATENTS

| Number | Name | Date |
|---|---|---|
| 1,991,005 | Whitman | Feb. 12, 1935 |
| 2,251,381 | Wright | Aug. 5, 1941 |
| 2,293,212 | Offen | Aug. 18, 1942 |
| 2,339,981 | Cranmer et al. | Jan. 25, 1944 |
| 2,352,331 | Leline | June 27, 1944 |
| 2,352,542 | Heins | June 27, 1944 |
| 2,355,790 | Faulkner | Aug. 15, 1944 |
| 2,374,080 | Dale | Apr. 17, 1945 |
| 2,435,264 | Ansar | Feb. 3, 1948 |